United States Patent
Conlin et al.

(10) Patent No.: US 11,356,465 B1
(45) Date of Patent: Jun. 7, 2022

(54) MOBILE DEVICE MANAGEMENT FOR REMEDIATING SECURITY EVENTS

(71) Applicant: JAMF Software, LLC, Minneapolis, MN (US)

(72) Inventors: Kelli Conlin, Land O Lakes, FL (US); Catherine McKay, Nashua, NH (US); Sean Rabbitt, Winnemucca, NV (US)

(73) Assignee: JAMF SOFTWARE, LLC, Minneapolis, MN (US)

( * ) Notice: Subject to any disclaimer, the term of this patent is extended or adjusted under 35 U.S.C. 154(b) by 0 days.

(21) Appl. No.: 17/581,486

(22) Filed: Jan. 21, 2022

(51) Int. Cl.
*H04L 9/40* (2022.01)

(52) U.S. Cl.
CPC ........ *H04L 63/1416* (2013.01); *H04L 63/102* (2013.01); *H04L 63/105* (2013.01); *H04L 63/145* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 2018/0288063 A1* | 10/2018 | Koottayi | ................ | G06F 15/76 |
| 2019/0036925 A1* | 1/2019 | Isola | .................... | H04L 63/107 |
| 2019/0036926 A1* | 1/2019 | Isola | .................... | H04L 63/1425 |
| 2019/0036942 A1* | 1/2019 | Isola | .................... | H04L 63/1416 |
| 2019/0190931 A1* | 6/2019 | Levin | ...................... | H04L 63/20 |
| 2020/0137055 A1* | 4/2020 | Isola | .................... | H04L 63/0876 |
| 2020/0236119 A1* | 7/2020 | Chamarajnager | ... | G06F 9/45558 |

\* cited by examiner

*Primary Examiner* — Joseph P Hirl
*Assistant Examiner* — Hassan Saadoun
(74) *Attorney, Agent, or Firm* — Benesch, Friedlander, Coplan & Aronoff LLP

(57) ABSTRACT

According to certain aspects of the present disclosure, a computer-implemented method is provided that includes detecting a malicious activity or a security event on a managed device. The method includes adding the managed device to a group. The method includes removing a user configuration profile from, and transmitting a security configuration profile to, the managed device. The method includes placing the managed device in a protect state to notify and forcibly log out the end user. The method includes notifying the end user that access is prohibited. The method includes clearing the managed device from being in the protect state after remediation of the malicious activity or the security event. The method includes removing, responsive to clearing the managed device from being in the protective state, the security configuration profile from, and transmitting the user configuration profile to, the managed device. Systems and machine-readable media are also provided.

20 Claims, 9 Drawing Sheets

49 ⟶

50 ⟶

Setting : Computer Management > Extension Attributes
← New Computer Extension Attribute

Display Name Display name for the extension attribute

[ Jamf Protect - Smart Groups ]

☑ Enabled (script input type only)

Description Description for the extension attribute

[ List containing all smart groups scoped by Jamf Protect ]

Data Type Type of data being collected

[ String ▾ ]

Inventory Display Category in Which to Display the extension attribute in Jamf Pro

[ General ▾ ]

Input Type Input type to use to populate the extension attribute

[ Script ▾ ]

[ Default Mode ▾ ] [ Default Theme ▾ ]

```bash
#!/bin/bash

SMARTGROUPS_DIR=/Library/Application\ Support/jamProtect/groups
if [ -d "$SMARTGROUPS_DIR" ]; then
    SMART_GROUPS=`/bin/ls "$SMARTGROUPS_DIR"|tr '\n' ','`
    echo "<result>${SMART_GROUPS%?}</result>"
else
    echo "<result></result>"
fi exit 0
```

FIG. 4A

MOBILE DEVICE MANAGEMENT FOR REMEDIATING SECURITY EVENTS

TECHNICAL FIELD

The present disclosure generally relates to management systems of mobile devices, and more specifically relates to mobile device management for remediating security events.

BACKGROUND

Mobile devices are often used during personal time as well as during non-personal times such as, for example, educational time and work time. For example, an end user may use a single mobile device for multiple purposes such as for personal activities as well as for school or work purposes. In many instances, during school or work hours, the mobile device is connected to the school or work network in addition to other devices that are also connected to the network. While the school or company typically monitors the mobile devices connected to the network to manage and maintain school or work functions on the mobile devices, an end user on one of the managed mobile devices may still encounter malicious activity or a security event that may not be detected efficiently such that the end user continues to use the managed mobile device with the malicious activity or security event is still active, which may potentially expose the school or company, as well as to the other devices connected over the network, to additional damage.

The description provided in the background section should not be assumed to be prior art merely because it is mentioned in or associated with the background section. The background section may include information that describes one or more aspects of the subject technology.

SUMMARY

The present disclosure provides systems and methods for remediating security events detected on managed devices via mobile device management. When malicious activity is detected on a managed device the subject technology mitigates damage done to the managed device by stopping the end user from continuing use of the managed device. The end user is notified that the managed device may have been comprised and that the managed device will be inaccessible to the end user until after the malicious activity or security event is remediated. Once the end user is notified, login and access to the managed device is isolated and only trusted members of a security team are allowed access to the managed device in order to perform forensic analysis and remediation of the malicious activity or security event. After the malicious activity or security event is remediated, access to the managed device is restored to the end user.

According to certain aspects of the present disclosure, a computer-implemented method is provided. The method includes detecting one of a malicious activity and a security event on a managed device. The method includes adding the managed device to a group identifying that one of the malicious activity and the security event is detected. The method includes removing a user configuration profile from the managed device. The method includes transmitting a security configuration profile to the managed device. The method includes selecting a policy trigger placing the managed device in a protect state to run a script to notify an end user of the managed device and forcibly log out the end user. The method includes loading a policy banner at a login screen of the managed device notifying the end user, via the managed device, that access is prohibited to the managed device. The method includes clearing, in response to execution of an application after analysis and remediation of one of the malicious activity and the security event, the managed device from being in the protect state. The method includes removing, responsive to the managed device cleared from being in the protective state, the security configuration profile from the managed device and transmitting the user configuration profile to the managed device.

According to other aspects of the present disclosure, a system is provided. The system includes a memory comprising instructions and a processor configured to execute the instructions which, when executed, cause the processor to detect one of a malicious activity and a security event on a managed device. The processor is configured to execute the instructions which, when executed, cause the processor to add the managed device to a group identifying that one of the malicious activity and the security event is detected. The processor is configured to execute the instructions which, when executed, cause the processor to remove a user configuration profile from the managed device. The processor is configured to execute the instructions which, when executed, cause the processor to transmit a security configuration profile to the managed device. The processor is configured to execute the instructions which, when executed, cause the processor to select a policy trigger placing the managed device in a protect state to run a script to notify an end user of the managed device and forcibly log out the end user. The processor is configured to execute the instructions which, when executed, cause the processor to load a policy banner at a login screen of the managed device notifying the end user, via the managed device, that access is prohibited to the managed device. The processor is configured to execute the instructions which, when executed, cause the processor to clear, in response to execution of an application after analysis and remediation of one of the malicious activity and the security event, the managed device from being in the protect state. The processor is configured to execute the instructions which, when executed, cause the processor to remove, responsive to the managed device cleared from being in the protective state, the security configuration profile from the managed device and transmitting the user configuration profile to the managed device.

According to other aspects of the present disclosure, a non-transitory machine-readable storage medium comprising machine-readable instructions for causing a processor to execute a method is provided. The method includes detecting one of a malicious activity and a security event on a managed device. The method includes adding the managed device to a group identifying that one of the malicious activity and the security event is detected. The method includes removing a user configuration profile from the managed device. The method includes transmitting a security configuration profile to the managed device. The method includes selecting a policy trigger placing the managed device in a protect state to run a script to notify an end user of the managed device and forcibly log out the end user. The method includes loading a policy banner at a login screen of the managed device notifying the end user, via the managed device, that access is prohibited to the managed device. The method includes clearing, in response to execution of an application after analysis and remediation of one of the malicious activity and the security event, the managed device from being in the protect state. The method includes removing, responsive to the managed device cleared from being in the protective state, the security configuration profile from the managed device and transmitting the user configuration profile to the managed device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. It should be noted that although various aspects may be described herein with reference to particular settings, these are examples only and are not to be considered limiting. The teachings of the present disclosure may be applied to other mobile device and endpoint device environments, including but not limited to teaching environments, corporate environments, home environments, retail environments, healthcare environments, and other organizational environments well-known in the industry. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 4A-4E are example illustrations associated with the example process of FIG. 3.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

The disclosed systems and methods provide a solution to traditional systems and processes of remediating security events via mobile device management. For example, the disclosed systems and methods monitor managed devices to detect malicious activity and security events. Once malicious activity or a security event is detected on the managed device, the subject technology limits access to the managed device by the end user and isolates access to the managed device to a security administrator. After analysis and remediation of the security event, access to the managed device is restored to the end user.

The disclosed systems and methods address a technical problem tied to computer technology and arising in the realm of mobile device management, namely the technical problem of monitoring malicious activity and security events on managed devices in organizational environments and remediating such security events in an efficient manner that prevents the managed device from potentially exposing the organizational environment to additional damage. The disclosed systems and methods solve this technical problem by securing access from an end user to the managed device for remediation after detection of the malicious activity and security events and restoring access to the end user to the managed device after remediation in order to increase network security.

Figure 1:
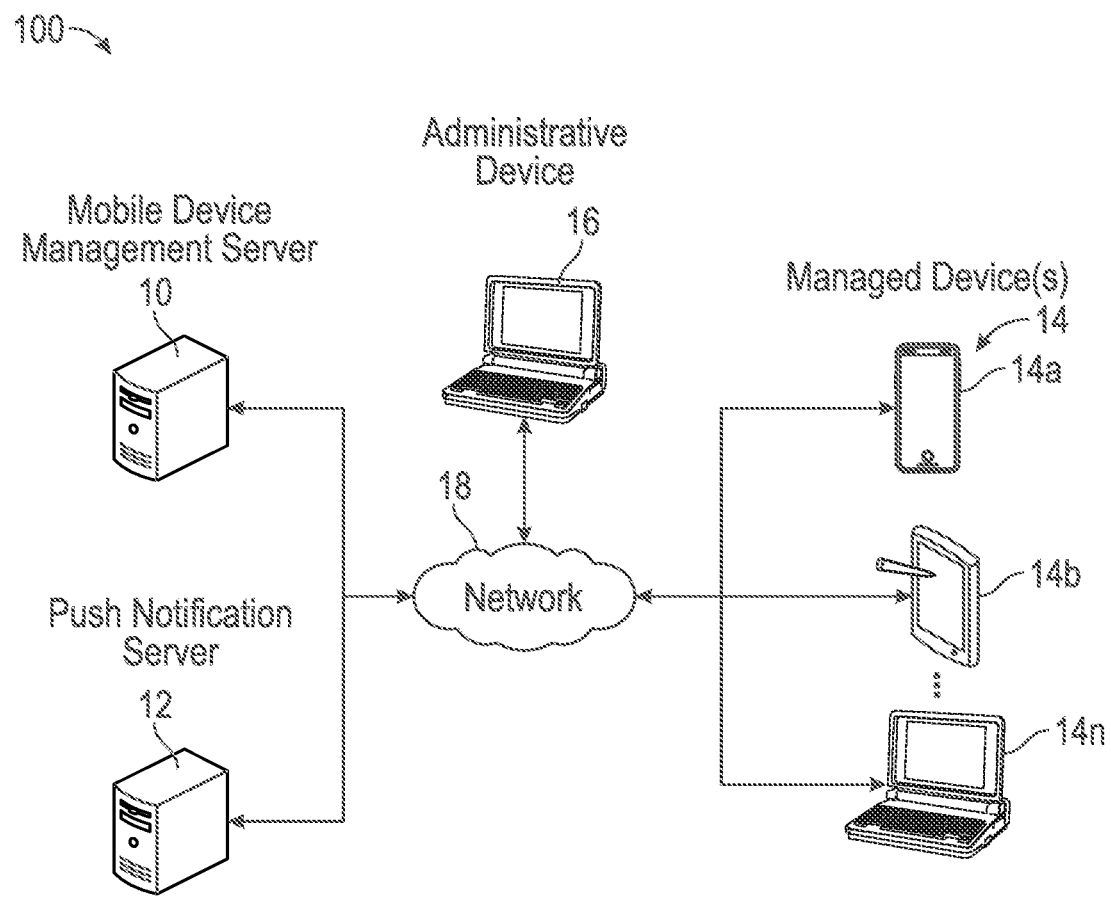
FIG. 1 illustrates an example architecture for remediating malicious activity and security events of managed devices.

FIG. 1 illustrates an example architecture 100 for remediating security events in an organizational environment. For example, the architecture 100 includes a mobile device management server 10, a push notification server 12, at least one managed device 14, such as managed devices 14*a*, 14*b* . . . 14*n*, and at least one administrative device 16, such as the administrative device 16*a*, all connected over a network 18. In certain aspects, the mobile device management server 10 may be connected to the push notification server 12 over a separate network.

The mobile device management server 10 can be any device having an appropriate processor, memory, and communications capability for communicating with the push notification server 12, the at least one managed device 14, and the at least one administrative device 16. For purposes of load balancing, the mobile device management server 10 may include multiple servers. The push notification server 12 can be any device having an appropriate processor, memory, and communications capability for communicating with the mobile device management server 10 and the at least one managed device 14. The at least one managed device 14, such as the first managed device 14*a*, to which the mobile device management server 10 communicates with over the network 18 via the push notification server 12, can be any endpoint device, for example, a tablet computer, a mobile phone, a mobile computer, a laptop computer, a portable media player, an electronic book (eBook) reader, a desktop computer, or any other device having appropriate processor, memory, and communications capabilities. The at least one administrative device 16, to which the mobile device management server 10 communicates with over the network 18, can be, for example, a tablet computer, a mobile phone, a mobile computer, a laptop computer, a portable media player, an electronic book (eBook) reader, a desktop computer, or any other device having appropriate processor, memory, and communications capabilities. In certain aspects, the mobile device management server 10 and the push notification server 12 can be a cloud computing server of an infrastructure-as-a-service (IaaS) and be able to support a platform-as-a-service (PaaS) and software-as-a-service (SaaS) services.

It should be noted that the present disclosure is not limited to any particular configuration or number of managed devices, such as the at least one managed device 16. In certain aspects, a different number of managed devices may be present.

The network 18 can include, for example, any one or more of a personal area network (PAN), a local area network (LAN), a campus area network (CAN), a metropolitan area network (MAN), a wide area network (WAN), a broadband network (BBN), the Internet, and the like. Further, the network 18 can include, but is not limited to, any one or more of the following network topologies, including a bus network, a star network, a ring network, a mesh network, a star-bus network, tree or hierarchical network, and the like.

Figure 2:
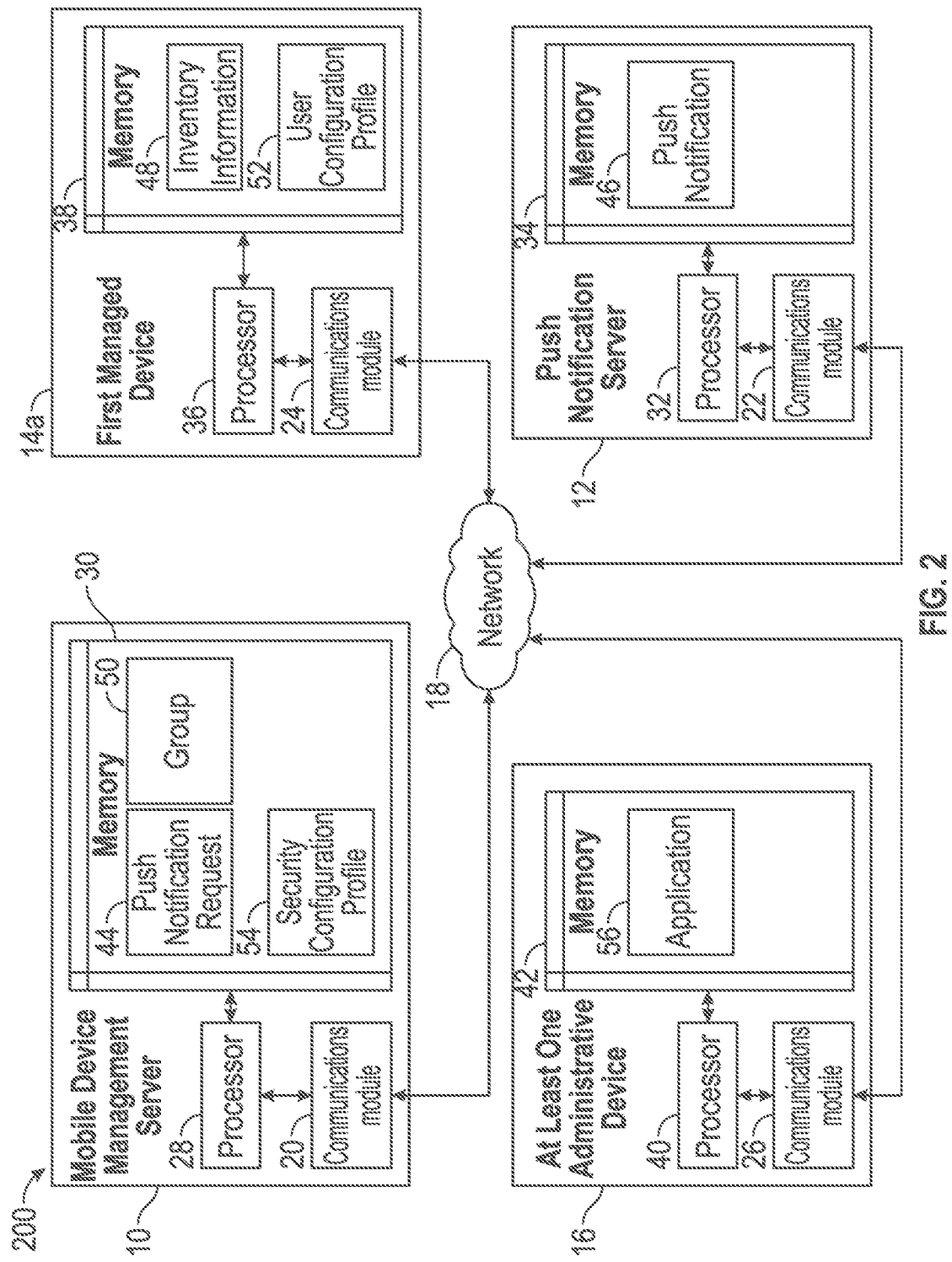
FIG. 2 is a block diagram illustrating an example mobile device management server, push notification server, managed device, and administrative device from the architecture of FIG. 1 according to certain aspects of the disclosure.

FIG. 2 is a block diagram illustrating examples of the mobile device management server 10, the push notification server 12, the at least one managed device 14, such as the first managed device 14a, and the at least one administrative device 16 in the architecture of FIG. 1 according to certain aspects of the disclosure. It should be understood that while the mobile device management server 10 manages a plurality of managed devices, such as the at least one managed device 14, the first managed device 14a will be discussed in particular to simplify description of the present disclosure.

The mobile device management server 10, the push notification server 12, the first managed device 14a, and the at least one administrative device 16 are connected over the network 18 via respective communications modules 20, 22, 24, 26. The communications modules 20, 22, 24, 26 are configured to interface with the network 18 to send and receive information, such as data, requests, responses, and commands to other devices on the network 18. The communications modules 20, 22, 24, 26 can be, for example, modems or Ethernet cards.

The mobile device management server 10 includes a processor 28, the communications module 20, and a memory 30. The processor 28 of the mobile device management server 10 is configured to execute instructions, such as instructions physically coded into the processor 28, instructions received from software in the memory 30, or a combination of both. The mobile device management server 10 may correspond to hardware and/or software that implement mobile device management functions.

The push notification server 12 includes a processor 32, the communications module 22, and a memory 34. The processor 32 of the push notification server 12 is configured to execute instructions, such as instructions physically coded into the processor 38, instructions received from software in the memory 34, or a combination of both. The push notification server 12 may correspond to one or more servers configured to transmit push notifications over the network 18 to devices, such as the at least one managed device 14.

The at least one managed device 14, such as the first managed device 14a, includes a processor 36, the communications module 24, and a memory 38. The processor 36 of the first managed device 14a is configured to execute instructions, such as instructions physically coded into the processor 36, instructions received from software in memory 38, or a combination of both.

The at least one administrative device 16 includes a processor 40, the communications module 26, and a memory 42. The processor 40 of the at least one administrative device 16 is configured to execute instructions, such as instructions physically coded into the processor 40, instructions received from software in memory 38, or a combination of both.

It should be noted that the teachings of the present disclosure may be applied in various mobile device environments, including but not limited to educational settings, home environments, corporate environments, retail environments, healthcare environments, government environments, organization environments, and other environments well-known in the industry.

The mobile device management server 10 is configured to manage the at least one managed device 14, such as the first managed device 14a. The mobile device management server 10 is configured to transmit at least one push notification request 44 to the push notification server 12 to transmit a push notification 46 to the at least one managed device 14, such as the first managed device 14a. For example, the push notification 46 may be associated with check-in events that cause the at least one managed device 14 to communicate with the mobile device management server 10 to check whether any actions are to be performed, to transmit inventory information 48 to the mobile device management server 10, and other check-in events. In certain aspects, the push notification 46 can include or identify instructions of the action to be performed. In certain other aspects, a notification and/or an action may be pushed by the mobile device management server 10 directly to the at least one managed device 14.

The mobile device management server 10 is configured to monitor the first managed device 14a to detect malicious activity and security events. Malicious activity and security events can include, but are not limited to, malware, privacy violations, potentially unwanted programs (PUP), unwanted behaviors, elevated administrator privileges, unwanted USB devices, and unwanted screenshot activity. The mobile device management server 10 is configured to receive the inventory information 48 from the first managed device 14a. The inventory information 48 can include information such as, but not limited to, detection of malicious activity and security events on the first managed device 14a. Responsive to detecting malicious activity or a security event, or receiving the inventory information 48 from the first managed device 14a that malicious activity or a security event has been detected, on the first managed device 14a, the mobile device management server 10 is configured to add an attribute 49 to the first managed device 14a adding it to a group 50, which organizes managed devices, such as the first managed device 14a, belonging to a specific grouping criteria such as, for example for managed devices with detected malicious activity or a security event.

The mobile device management server 10 is configured to remove a user configuration profile 52 from the first managed device 14a and transmit a security configuration profile 54 to the first managed device 14a to replace the user configuration profile 52. The security configuration profile 54 is received by the first managed device 14a to allow the mobile device managements server 10 to perform actions on the first managed device 14a such as, but not limited to, limiting logins to only when connected to a network, such as network 18, limiting logins to only restricted members of the domain (e.g., IT security team), replacing a wallpaper on a login screen of the first managed device 14a with a notice that only security team members may log into the first managed device 14a (e.g., notice that logging into the first managed device 14a is limited to only security team members), adding a policy banner notifying an end user of the first managed device 14a that only security team members may log into the first managed device 14a, and other actions. For example, in certain aspects, the mobile device management server 10 is configured to select a policy trigger placing the first managed device 14a in a protect state to run a script notifying the end user of the first managed device 14a that a security event has occurred, that the first managed device 14*a* will reboot, and the end user will not be able to access the first managed device 14*a* until the security event has been remediated. In such aspects, the mobile device management server 10 will then forcibly log out the end user from the first managed device 14*a*. The mobile device management server 10 is configured to, after forcibly logging out the end user from the first managed device 14*a*, load the policy banner notifying the end user that access to the first managed device 14*a* is prohibited, even with a local user account or with local account administrator permission.

After the security team member, via the at least one administrative device 16, for example, has performed forensic analysis and remediation of the malicious activity or security event associated with the first managed device 14*a*, the security team member can execute an application 56 causing the mobile device management server 10 to clear the first managed device 14*a* from being in the protect state. Responsive to the first managed device 14*a* being cleared from the protect state, the mobile device management server 10 removes the security configuration profile 54 from the first managed device 14*a* and replaces it with the user configuration profile 52, which will allow the end user to access the first managed device 14*a* with proper login information.

Figure 3:
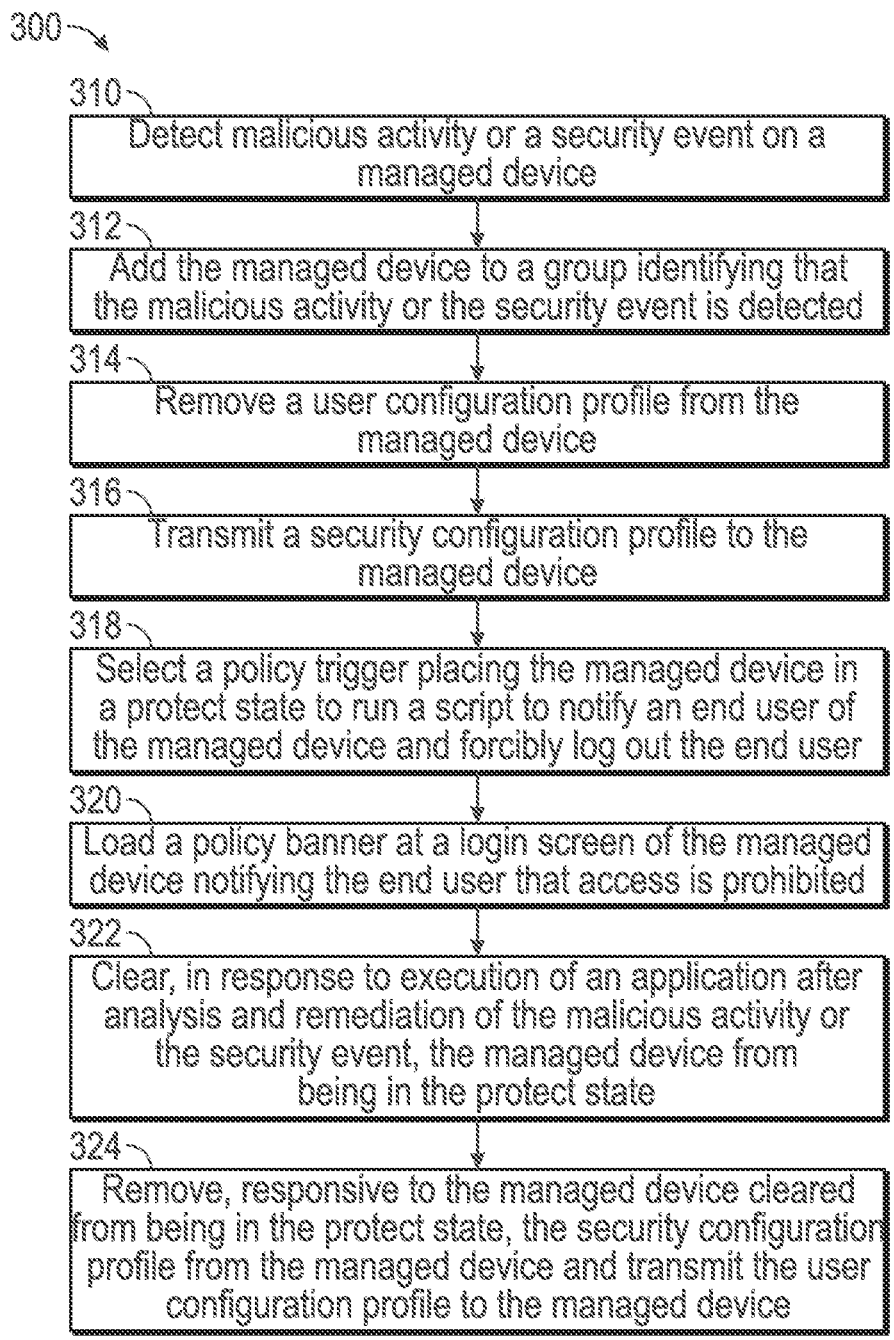
FIG. 3 illustrates an example process for using the example mobile device management server, push notification server, managed device, and, in some aspects, the administrative device of FIG. 2.

FIG. 3 illustrates an example process 300 using at least the mobile device management server 10 and the first managed device 14*a* of the at least one managed device 14 of FIG. 2. While FIG. 3 is described with reference to FIG. 2, it should be understood that the process steps of FIG. 3 may be performed by other systems.

The process begins by proceeding to step 310 when the processor 28 of the mobile device management server 10 detects malicious activity or a security event on the first managed device 14*a*. In certain aspects, the mobile device management server 10 receives the inventory information 48 from the first managed device 14*a* indicating that malicious activity or a security event is detected. As depicted at step 312, the processor 28 of the mobile device management server 10 adds the first managed device 14*a* to the group 50 identifying that malicious activity or a security event has been detected. At step 314, the processor 28 of the mobile device management server 10 removes the user configuration profile 52 from the first managed device 14*a* and, as depicted at step 316, transmits the security configuration profile 54 to the first managed device 14*a* to replace the user configuration profile 52. In certain aspects, the security configuration profile 54 limits login to the first managed device 14*a* to only when connected to a network, such as the network 18, limits logins to the first managed device 14*a* to only restricted members of a predefined domain, replaces a wallpaper on a login screen of the first managed device 14*a* with a notice that only security team members may log into the first managed device 14*a*, and adds a policy banner notifying the end user of the first managed device 14*a* that only security team members may log into the first managed device 14*a*.

As depicted at step 318, the processor 28 of the mobile management device 10 selects a policy trigger placing the first managed device 14*a* in a protect state to run a script notifying the end user of the first managed device 14*a* that a security event has occurred, that the first managed device 14*a* will reboot, and the end user will not be able to access the first managed device 14*a* until the security event has been remediated, and then forcibly logs out the end user. After forcibly logging out the end user from the first managed device 14*a*, the processor 28 of the mobile management device 10 loads the policy banner at the login screen notifying the end user that access to the first managed device 14*a* is prohibited, even with a local user account or with local account administrator permission, as depicted at step 320.

Responsive to execution of the application 56 by the security team member after having performed forensic analysis and remediation of the malicious activity or security event associated with the first managed device 14*a*, the mobile device management server 10 clears the first managed device 14*a* from being in the protect state, as depicted at step 322. With the first managed device 14*a* cleared from the protect state, the mobile device management server 10 removes the security configuration profile 54 from first managed device 14*a* and transmits the user configuration profile 52 to the first managed device 14*a* to replace the security configuration profile 54, which will allow the end user to access the first managed device 14*a* with proper login information, as depicted at step 324.

FIG. 3 sets forth the example process 300 using at least the mobile device management server 10 and the first managed device 14*a* of FIG. 2. An example will now be described with reference to the example process of FIG. 3 and the example illustrations in FIGS. 4A-4E.

Figure 4B:
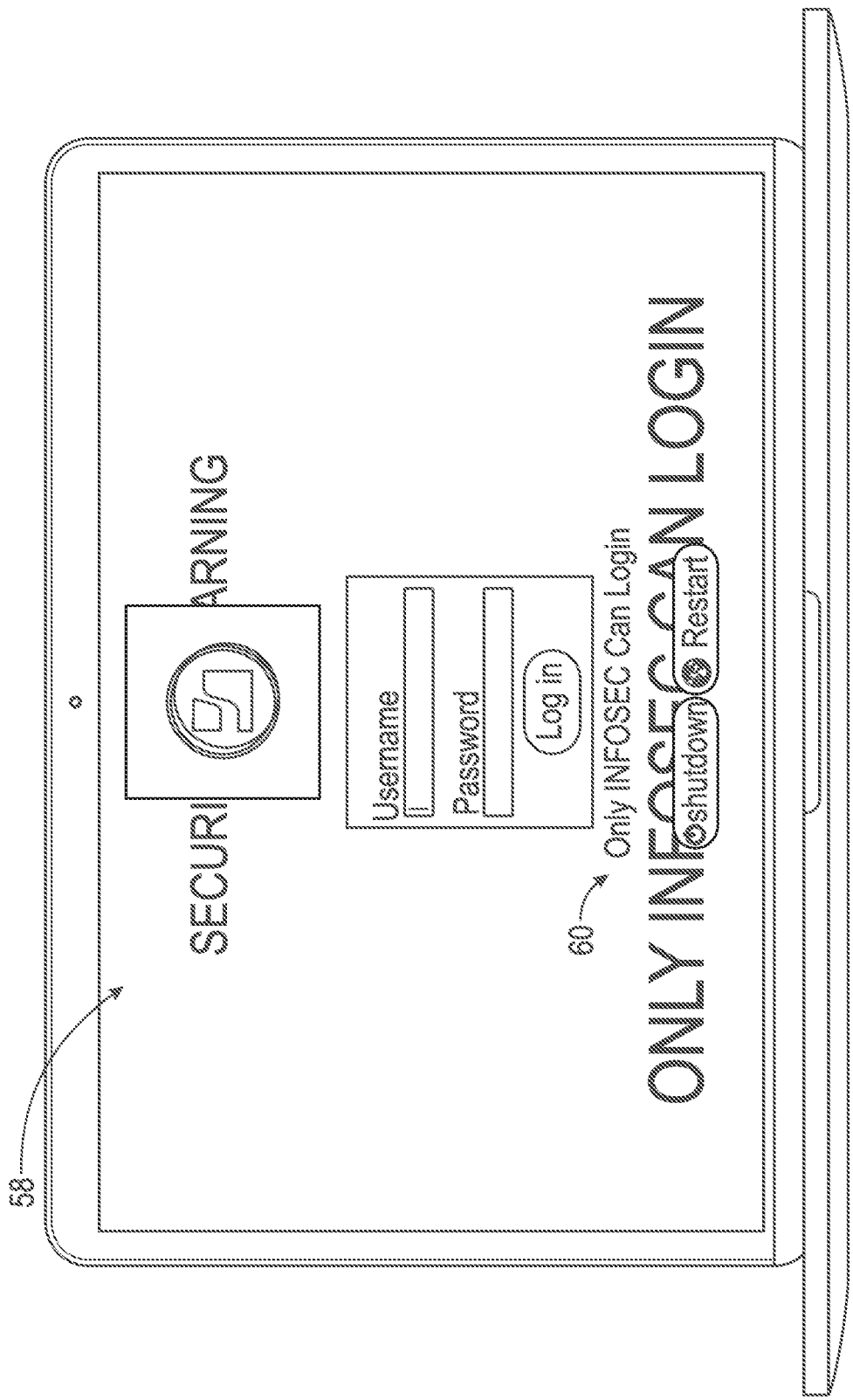

As an example, the end user may unwittingly encounter malicious activity or a security event on the first managed device 14*a*, which the mobile device management server 10 detects. In certain aspects, the mobile device management server 10 receives inventory information 48 from the first managed device 14*a* indicating detection of malicious activity or a security event. In response to detecting the malicious activity or security event on the first managed device 14*a*, the mobile device management server 10 adds the attribute 49 to the first managed device 14*a* adding it to the group 50, as illustrated in FIG. 4A. With the first managed device 14*a* added to the group 50, the mobile device management server 10 can begin actions to remediate the detected malicious activity or security event on the first managed device 14*a*. For example, the mobile device management server 10 removes the user configuration profile 52 from the first managed device 14*a* and replaces it with the security configuration profile 54, which limits login to only working with a network present, limits login to only restricted members (e.g., security team member), replaces a wallpaper on a login screen of the first managed device 14*a* with a security wallpaper 58 (see FIG. 4B) notifying the end user that only security team members may log into the first managed device 14*a*, and adds a policy banner 60 (see FIG. 4B) notifying the end user of the first managed device 14*a* that only security team members may log into the first managed device 14*a*.

Figure 4C:
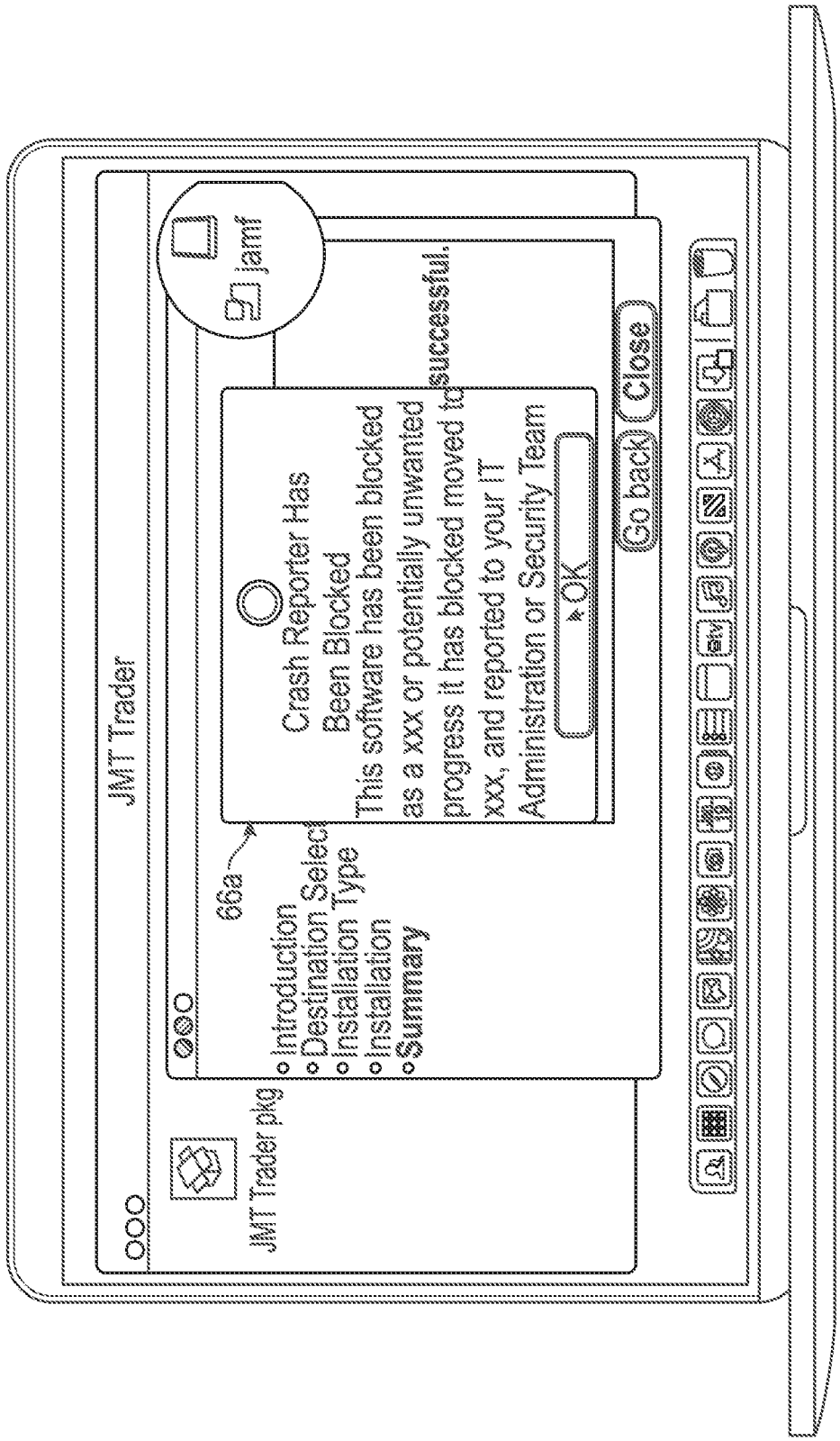
Figure 4D:
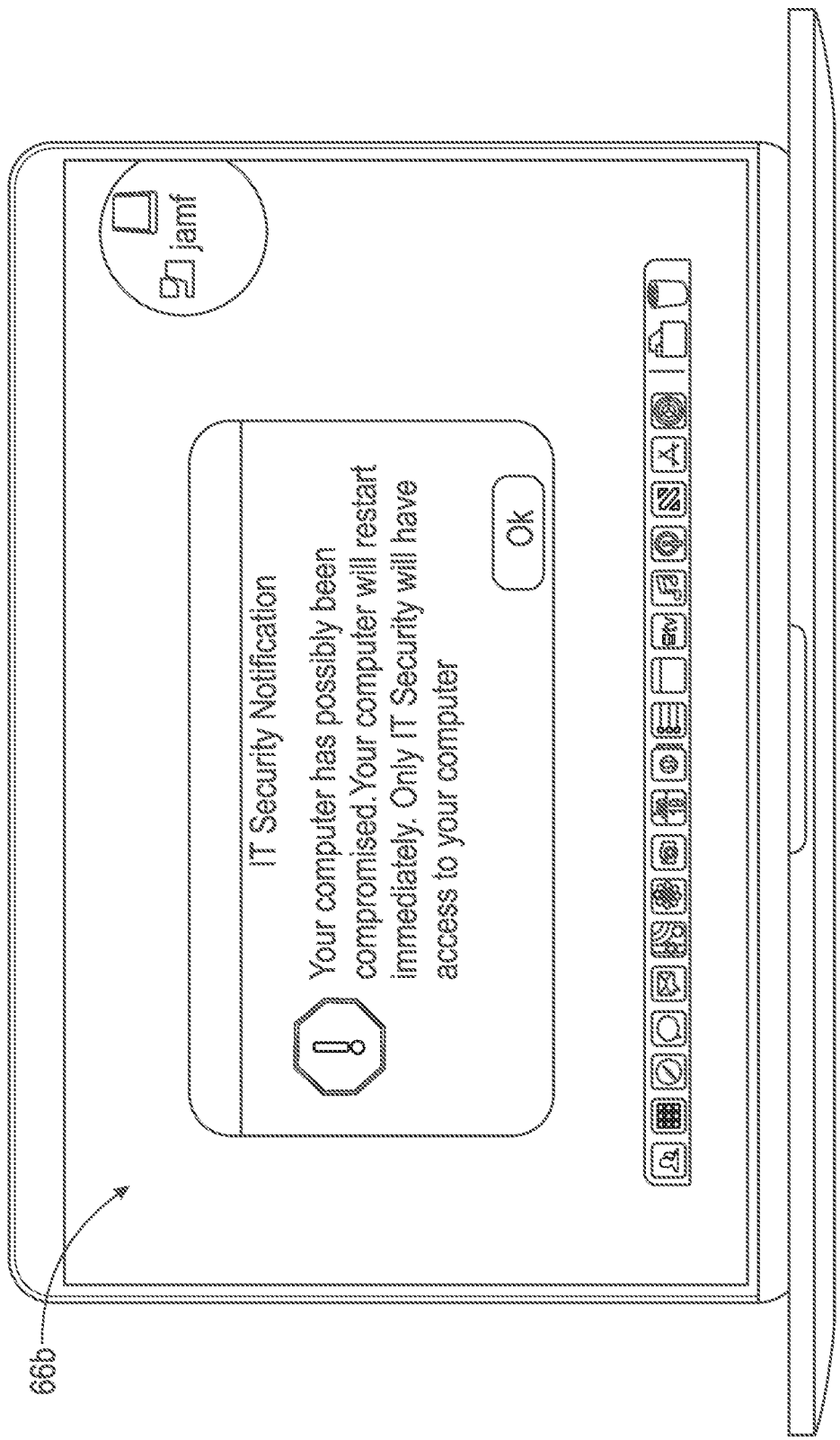
Figure 4E:
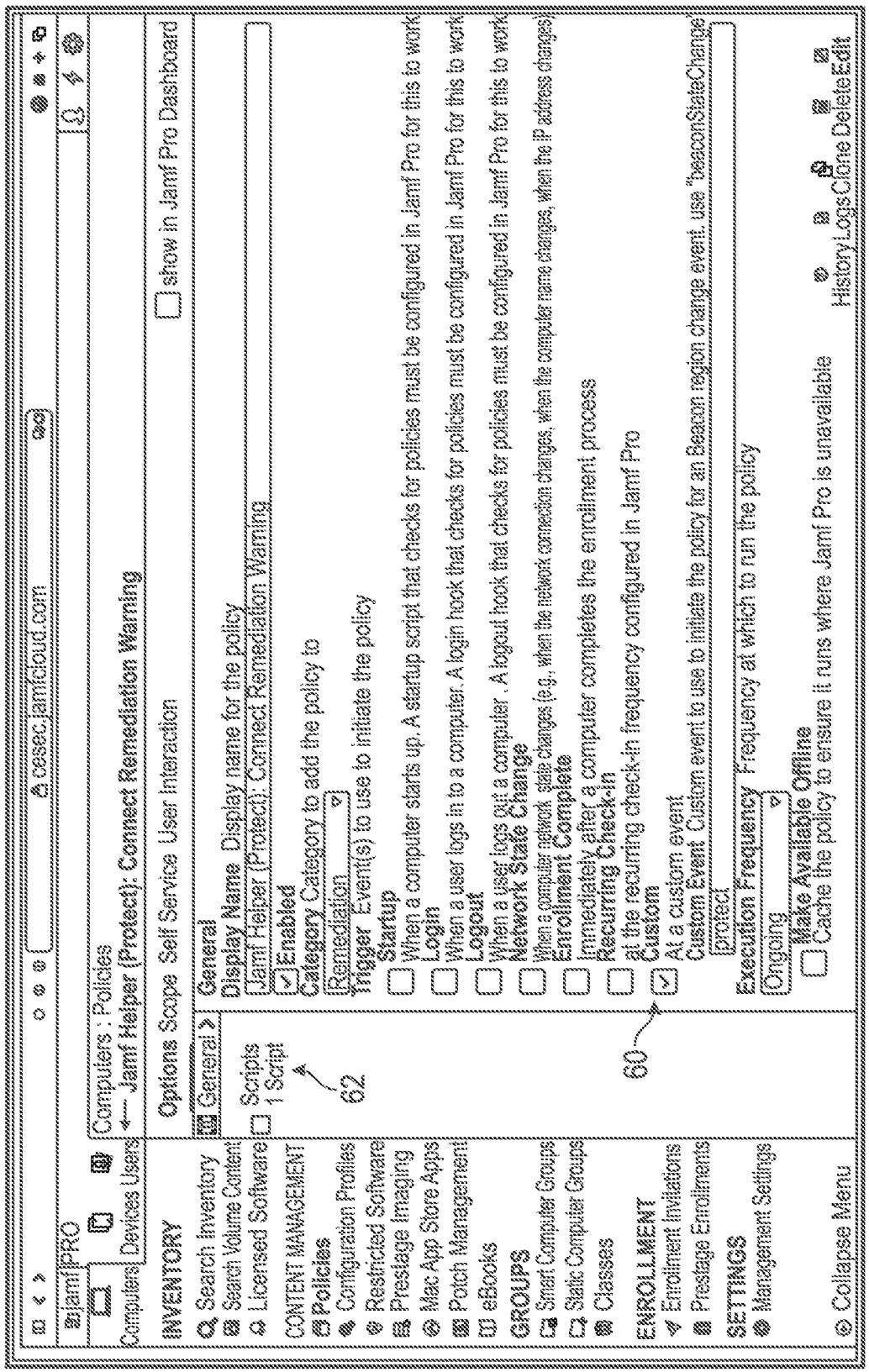

Continuing the example, with the security configuration profile 54 on the first managed device 14*a*, the mobile device management server 10 selects the policy trigger 62 (see FIG. 4E) placing the first managed device 14*a* in the protect state to run the script 64 notifying the end user of the first managed device 14*a* in a notification 66*a* that a security event has occurred, as illustrated in FIG. 4C, and notifying the end user in a notification 66*b* that the first managed device 14*a* will reboot and that the end user will not be able to access the first managed device 14*a* until the security event has been remediated, as illustrated in FIG. 4D. The mobile device management server 10 will then forcibly log out the end user from the first managed device 14*a* and load the policy banner 60 notifying the end user that access to the first managed device 14*a* is prohibited. Even with a local user account or with local account administrator permission, the end user will be prohibited from logging into the first managed device 14*a*.

With the security configuration profile 54 on the first managed device 14*a* and the end user forcibly logged out of the first managed device 14*a*, a security member can use the at least one administrative device 16 to perform forensic analysis and remediation of the malicious activity or security event. Once remediation of the malicious activity or security event has been successfully completed, the security member can execute the application 56 causing the mobile device management server 10 to clear the first managed device 14*a* from the protect state. After the first managed device 14*a* is cleared from the protect state, the mobile device management server 10 removes the security configuration profile 54 from the first managed device 14*a* and transmits the user configuration profile 52 back to the first managed device 14*a* to allow the end user to gain access to the first managed device 14*a* with proper login information.

Figure 5:
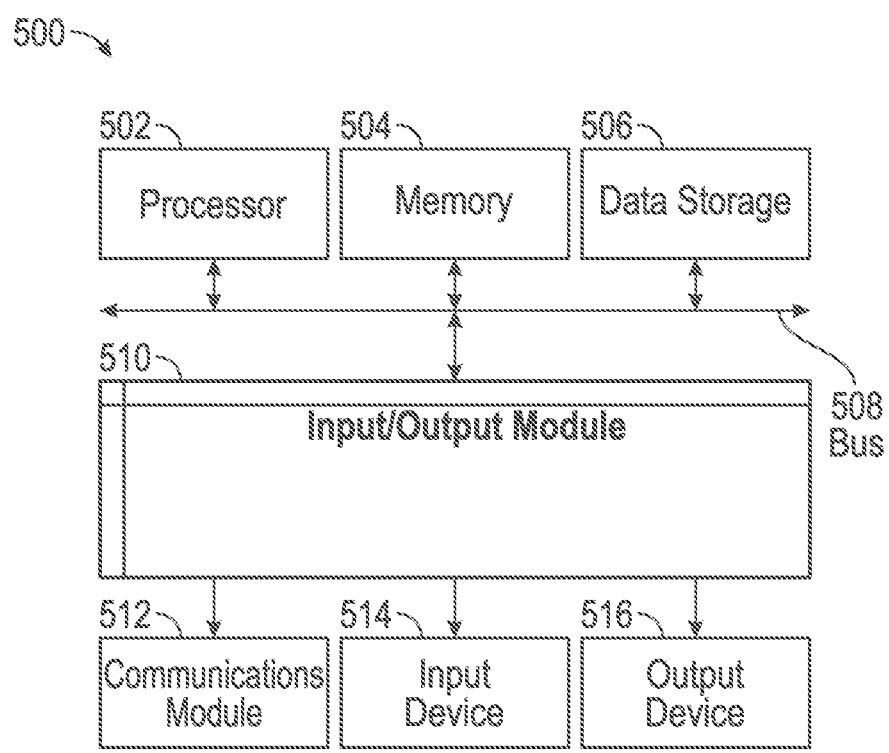
FIG. 5 is block diagram illustrating an example computer system with which the mobile device management server, push notification server, managed device, and administrative device of FIG. 2 can be implemented.

FIG. 5 is a block diagram illustrating an example computer system 500 with which the mobile device management server 10, the push notification server 12, the at least one managed device 14, such as the first managed device 14*a*, and the at least one administrative device 16 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., the mobile device management server 10, the push notification server 12, the at least one managed device 14, such as the first managed device 14*a*, and the at least one administrative device 16) includes a bus 508 or other communication mechanism for communicating information, and a processor 502 (e.g., the processor 28, 32, 36, 40) coupled with bus 508 for processing information. According to one aspect, the computer system 500 can be a cloud computing server of an IaaS that is able to support PaaS and SaaS services.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., the memory 30, 34, 38, 42), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, e.g., one or more modules of computer program instructions encoded on a computer readable medium for execution by, or to control the operation of, the computer system 500.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. Example communications modules 512 (e.g., the communications module 20, 22, 24, 26) include networking interface cards, such as Ethernet cards and modems.

In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device.

According to one aspect of the present disclosure the mobile device management server 10, the threat feed server 12, the push notification server 14, and the at least one managed device 16, such as the first managed device 16*a*, can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:
    detecting one of a malicious activity and a security event on a managed device;
    adding the managed device to a group identifying that one of the malicious activity and the security event is detected;
    removing a user configuration profile from the managed device;
    transmitting a security configuration profile to the managed device;
    selecting a policy trigger placing the managed device in a protect state to run a script to notify an end user of the managed device and forcibly log out the end user;
    loading a policy banner at a login screen of the managed device notifying the end user, via the managed device, that access is prohibited to the managed device;
    clearing, in response to execution of an application after analysis and remediation of one of the malicious activity and the security event, the managed device from being in the protect state; and
    removing, responsive to the managed device cleared from being in the protective state, the security configuration profile from the managed device and transmitting the user configuration profile to the managed device.

2. The computer-implemented method of claim 1, wherein adding the managed device to the group includes adding an attribute to the managed device for adding the managed device to the group.

3. The computer-implemented method of claim 1, wherein the security configuration profile limits logins on the managed device to only when connected to a network, limits logins on the managed device to only restricted members of a predefined domain, replaces a wallpaper on a login screen of the managed device, and adds a policy banner notifying an end user of the managed device.

4. The computer-implemented method of claim 3, wherein the wallpaper includes a notice that logging into the managed device is limited to only security team members.

5. The computer-implemented method claim 3, wherein the policy banner notifies the end user of the managed device that logging into the managed device is limited to only security team members.

6. The computer-implemented method of claim 1, wherein the malicious activity and the security event comprises one of malware, privacy violations, potentially unwanted programs (PUP), unwanted behaviors, elevated administrator privileges, unwanted USB devices, and unwanted screenshot activity.

7. The computer-implemented method of claim 1, wherein the end user is prohibited from logging into the managed device even with a local user account or with a local account administrator permission.

8. A system comprising:
    a memory comprising instructions; and
    a processor configured to execute the instructions which, when executed, cause the processor to:
        detect one of a malicious activity and a security event on a managed device;
        add the managed device to a group identifying that one of the malicious activity and the security event is detected;
        remove a user configuration profile from the managed device;
        transmit a security configuration profile to the managed device;
        select a policy trigger placing the managed device in a protect state to run a script to notify an end user of the managed device and forcibly log out the end user;
        load a policy banner at a login screen of the managed device notifying the end user, via the managed device, that access is prohibited to the managed device;
        clear, in response to execution of an application after analysis and remediation of one of the malicious activity and the security event, the managed device from being in the protect state; and
        remove, responsive to the managed device cleared from being in the protective state, the security configuration profile from the managed device and transmitting the user configuration profile to the managed device.

9. The system of claim 8, wherein the instructions to add the managed device to the group further comprises instructions to cause the processor to:
    add an attribute to the managed device for adding the managed device to the group.

10. The system of claim 8, wherein the security configuration profile limits logins on the managed device to only when connected to a network, limits logins on the managed device to only restricted members of a predefined domain, replaces a wallpaper on a login screen of the managed device, and adds a policy banner notifying an end user of the managed device.

11. The system of claim 10, wherein the wallpaper includes a notice that logging into the managed device is limited to only security team members.

12. The system of claim 10, wherein the policy banner notifies the end user of the managed device that logging into the managed device is limited to only security team members.

13. The system of claim 8, wherein the malicious activity and the security event comprises one of malware, privacy violations, potentially unwanted programs (PUP), unwanted behaviors, elevated administrator privileges, unwanted USB devices, and unwanted screenshot activity.

14. The system of claim 8, wherein the end user is prohibited from logging into the managed device even with a local user account or with a local account administrator permission.

15. A non-transitory machine-readable storage medium comprising machine-readable instructions for causing a processor to execute a method, the method comprising:
- detecting one of a malicious activity and a security event on a managed device;
- adding an attribute to the managed device to add the managed device to a group identifying that one of the malicious activity and the security event is detected;
- removing a user configuration profile from the managed device;
- transmitting a security configuration profile to the managed device;
- selecting a policy trigger placing the managed device in a protect state to run a script to notify an end user of the managed device and forcibly log out the end user;
- loading a policy banner at a login screen of the managed device notifying the end user, via the managed device, that access is prohibited to the managed device;
- clearing, in response to execution of an application after analysis and remediation of one of the malicious activity and the security event, the managed device from being in the protect state; and
- removing, responsive to the managed device cleared from being in the protective state, the security configuration profile from the managed device and transmitting the user configuration profile to the managed device.

16. The non-transitory machine-readable storage medium of claim 15, wherein the security configuration profile limits logins on the managed device to only when connected to a network, limits logins on the managed device to only restricted members of a predefined domain, replaces a wallpaper on a login screen of the managed device, and adds a policy banner notifying an end user of the managed device.

17. The non-transitory machine-readable storage medium of claim 16, wherein the wallpaper includes a notice that logging into the managed device is limited to only security team members.

18. The non-transitory machine-readable storage medium of claim 16, wherein the policy banner notifies the end user of the managed device that logging into the managed device is limited to only security team members.

19. The non-transitory machine-readable storage medium of claim 15, wherein the malicious activity and the security event comprises one of malware, privacy violations, potentially unwanted programs (PUP), unwanted behaviors, elevated administrator privileges, unwanted USB devices, and unwanted screenshot activity.

20. The non-transitory machine-readable storage medium of claim 15, wherein the end user is prohibited from logging into the managed device even with a local user account or with a local account administrator permission.

\* \* \* \* \*